June 21, 1932.  F. B. PITTS ET AL  1,863,671
CABLE LAYING APPARATUS
Filed Nov. 11, 1930   3 Sheets-Sheet 3
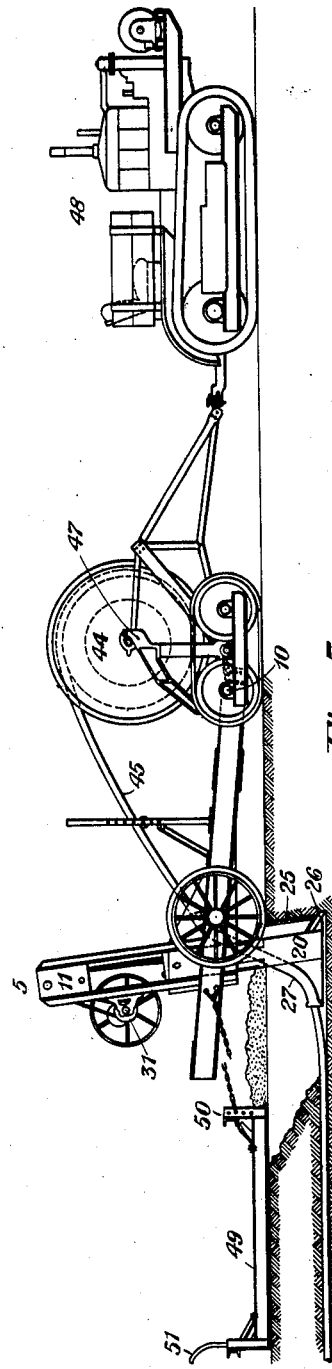
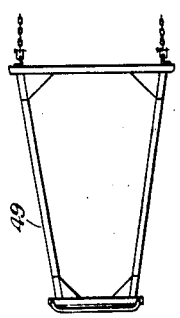
INVENTORS
F.B.Pitts, M.T.Garlinger and
BY  T.C.Smith
ATTORNEY Patented June 21, 1932

1,863,671

UNITED STATES PATENT OFFICE

FREDERICK R. PITTS, OF OKLAHOMA CITY, OKLAHOMA, AND MARSHALL T. GARLINGER, OF EAST ORANGE, AND TEMPLE C. SMITH, OF WESTFIELD, NEW JERSEY, ASSIGNORS TO AMERICAN TELEPHONE AND TELEGRAPH COMPANY, A CORPORATION OF NEW YORK

CABLE-LAYING APPARATUS

Application filed November 11, 1930. Serial No. 494,958.

This invention relates to apparatus for laying underground pipe, strand or the like, and more particularly to apparatus for laying underground electric telephone or telegraph cable, and has for its object the provision of improvements in arrangements of this character.

In accordance with one feature of the invention wheeled excavating apparatus is drawn over the surface of the ground by means of a tractor or the like, and such apparatus is provided with an earth-engaging member which may be lowered into the earth to form a narrow trench of a desired depth.

In accordance with another feature, cable is automatically fed into the trench so formed and the spoil pile or earth is back-filled to cover the cable and fill the trench after the advance of the wheeled apparatus.

Another feature of the invention consists in maintaining the earth-engaging member in a trench at a constant and predetermined depth and cutting angle.

These and other features which are considered characteristic of this invention, are set forth with particularity in the appended claims. The invention itself, both as to its organization and method of operation, together with other objects and advantages thereof, will be further explained in the following description having reference to the accompanying drawings consisting of the following figures.

Fig. 3 is a section taken on the line 3—3 of Fig. 1;

Fig. 4 is a section taken on the line 4—4 of Fig. 1;

Fig. 5 is a schematic view of the improved apparatus which is used in connection with the operation of digging trenches and the planting of cable therein; and Fig. 6 is a top view of a drag which is attached to the plow to back-fill the spoil pile or earth into the trench and cover the cable laid therein.

Figure 1:
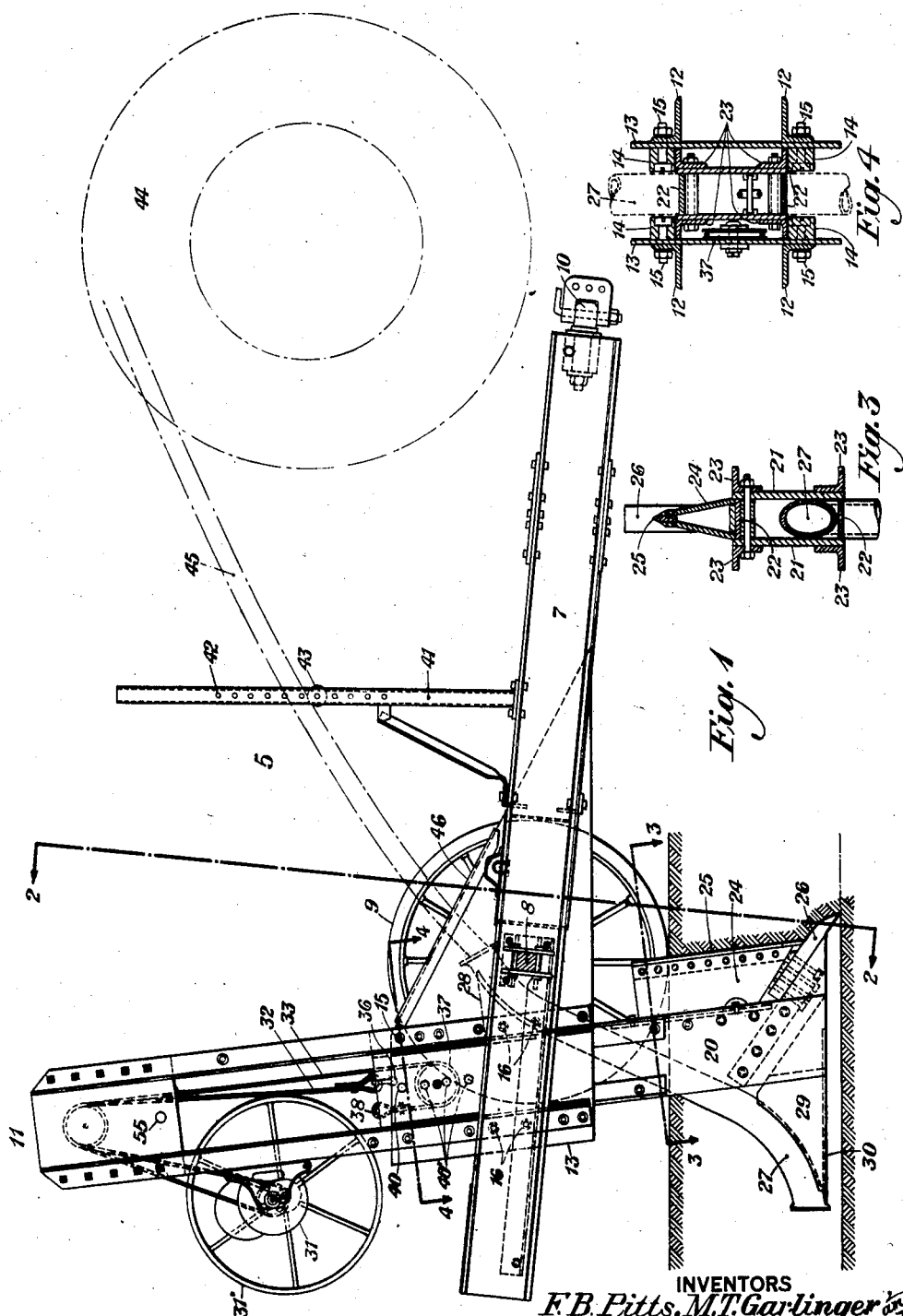
Figure 1 is a side elevation of the plow element which is used in combination with other elements of the improved apparatus.
Figure 2:
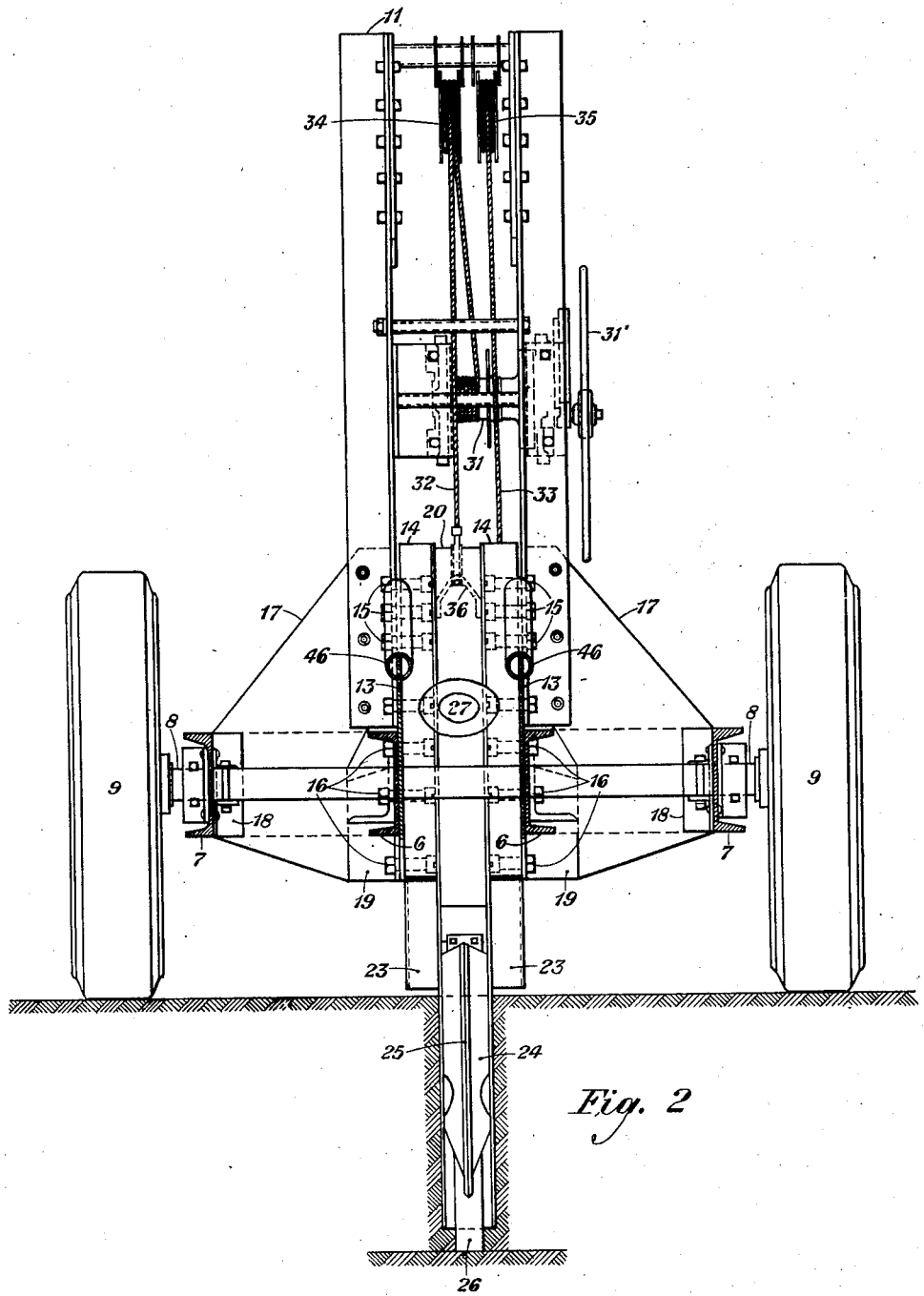
Fig. 2 is a front view of the plow taken on the line 2—2 of Fig. 1.

Referring to the drawings in which the improved apparatus is illustrated, the reference 5 designates a plow which is attached to equipment to be later described. The plow comprises a main frame consisting of two half sections suitably connected together. Each section extends longitudinally and is provided with an inner channel member 6 and an outer channel member 7. An axle 8 is supported by the outer channel members 7, and this axle in turn is mounted on wheels 9 in the usual manner. The distance between these wheels is such as to cause them to travel in a path or tracks made by the trailer and tractor, which elements precede the plow, as will later appear. The weight of the trailer and tractor is sufficient to cause a smooth path or surface to be made on which the wheels may travel. The forward end of the main frame is provided with suitable equipment by which it may be attached to a trailer. In the present instance this equipment is shown as comprising a universal joint 10. The axle 8 is so positioned on the main frame as to coincide with the longitudinal center of gravity. By this arrangement the effort required to raise or lower the forward end of the frame to couple or uncouple the plan to a cable reel carrier, to be later referred to, is reduced to a minimum. The rear portion of the main frame is provided with a tower 11. The tower while shown of a particular construction, as will be described below, may be of a different construction and be provided with hydraulic plungers, air cylinders, rack and pinion or the like. This tower member consists of a frame which is of substantially rectangular form and is provided with four angular members 12 which extend upwardly and in a slightly inclined position, as may be more clearly seen in Fig. 4. The angular members 12 are secured to parallel plates 13, and these parallel plates are each in turn secured to the inner channel members 6 of the main frame. A guide block 14 is secured to each of the four angular members 12. Bolts 15 pass through the blocks at their upper portions and through the supporting plates 13 and the angular members 12 and secure these members together. The guide blocks 14 at their lower portions are secured to the parallel side plates 13 and to the channel members 6 of the main frame by bolts 16. A gusset 17 is provided for each of the four angular members 12. These gussets are secured by rivets or the like to the angular members 12 and also to the outer channel members 7 by angular clips 18, and to the parallel side plates 13 by angular clips 19. The parallel plates 13 provide reinforcement for the framework in a longitudinal direction, and the gussets provide reinforcement for the framework in a lateral direction.

A support 20 for the earth-engaging and associated elements is slidably mounted within the tower 11 which forms a guideway therefor. The support and its associated elements are shown and described as comprising separate or built-up parts, but in practice the support and its elements may be formed integrally of castings or forgings. This support is substantially rectangular in form and has side walls 21 and end walls 22 which are of a dimension to permit the support to slidably move in the tower 11. These walls are joined together by bolts or the like and said bolts also secure angular guide members 23 to the support. A spreader 24 is carried by the support 20, and this spreader may comprise two plates to support a cutting edge 25 between their forwardly converging portions. The cutting edge 25 carried by the spreader cuts roots of any vegetable growth such as trees, shrubs and bushes, and also serves to move stones or rocks to one side as the plow travels along. The spreader 24 acts throughout its vertical length in conjunction with the cutting edge 25 to open the soil with a minimum amount of interference or resistance a sufficient width to allow the support 20 and a feed tube carried thereby to advance through the opening made in the soil. A removably positioned plow point 26 is also carried by the support 20, and this point is suitably secured in an angular slot in said support by bolts or the like, for instance, as shown in Fig. 1. This plow point 26 is made of suitable material to withstand the abrasive effect of earth, rock or other soil conditions to which it may be subjected in use. The point 26 is shown as being substantially rectangular in form and provided with a raked cutting edge at its forward extremity. This extremity projects forwardly and below the support 20 a sufficient distance to cut a clearance for the bottom of the support 20. The positioning of the point 26 in this manner causes the earth to be cut and spread so that a feed tube to be presently described is permitted to progress through the soil without substantial interference or resistance as the plow advances. The positioning of the point 26 as described is an important feature, in that it will cause a trench to be made at a constant predetermined depth, regardless of whether even ground, hills, gullies, or ditches are encountered by the plow in its advance.

A cable feed tube 27 is mounted on the support 20 and may be held in position by parallel pairs of gussets 28 and 29 which are suitably secured to said support. The positioning of the feed pipe in this manner provides a trussing or strengthening of both the support 20 and the tube 27 and insures their rigidity. The feed tube 27 is of sufficient internal diameter to permit the material which is to be laid in a trench to pass freely therethrough. If cable is to be laid this diameter is sufficiently larger than the diameter of the cable to permit it to pass readily through it without causing any undue or abrupt bending of the cable. The upper and lower ends of the feed tube 27 are flared to eliminate any sharp edges thereof coming in contact with the cable in its passage through the tube. The forming of the upper and lower ends of the tubes in this manner will prevent abrading or injury to the sheath of the cable as it enters or leaves the tube. The upper end of the tube is bent to a radius to conform to the curvature of the cable as it enters the tube upon being unwound from its drum. The lower end of the tube is bent to a radius to cause the cable to leave it in a comparatively straight line so that the cable will lie evenly and in a constant and uniform depth in a trench. The cable will be laid in the trench in this even and uniform depth regardless of the depth at which the trench is formed.

The principal operations covering the various functions of the plow comprise cutting roots, spreading the earth, moving stones to one side, cutting clearance for passage of the feed tube, and the immediate laying of the cable as it is discharged from the feed tube. The elements performing these functions should center as nearly as possible about a point just below the axle 8 which point may be called for convenience the center of operations. Accordingly, the elements carried by the support 20 comprising the spreader 24, root cutter 25, plow point 26 and feed tube 27 are located as near as possible beneath the center of the axle 8 when the plow 5 is in operating position on level ground. As these elements cannot be located at a single common point, the plow point 26 is ahead of, and the feed tube 27 is behind the center of operations.

It will be understood that the plow is adapted if desired to be used for agricultural purposes such as sub-soiling, breaking up soil or other like purposes. In this connection the spreader 24 and its root cutter 25, together with the plow point 26, will function as previously pointed out in connection with the description of these elements. The feed tube 27 may be used as shown, or it may be eliminated for this class of work if desired.

A bottom plate 30 is held between the lower parallel pair of gussets 29 and functions to prevent stones, sand or the like from entering the space between the gusset plates 29.

The support 20 is vertically adjustable in the tower 11 through the agency of positive elevating or lowering mechanism, and a hand-operated winch 31, which may be turned by means of the hand-wheel 31', is here shown by way of illustration for this purpose. This winch is connected to the slidable support 20 by means of wire ropes 32 and 33. These wire ropes pass through a sheave block 34 which is rotated to lift the support and a depressing sheave block 35 which is rotated to lower the support. The lowering of the support 20 in this manner causes pressure to be exerted by the support against the ground as the support is forced downwardly. The blocks 34 and 35 are suitably journaled in the upper portion of the tower 11. The wire rope 32 used for lifting the support is carried from the drum of the winch 31 about the sheave block 34 and the end of said rope is fastened to a clevis 36 secured to the top of the adjustable support 20. The rope 33 by which the support 20 is lowered is carried over the sheave block 35 and passes around a sheave block 37, journaled on one of the parallel side plates 13, and the end of the rope 33 is secured to a thimble 38 affixed to the top of the support 20. The rotation of the winch in one direction causes the rope 32 used for lifting the support to be wound upon the drum of the winch to raise the support 20 out of the ground, and the rotation of the winch in the opposite direction causes the rope 33 to be wound about its drum to lower and force the support 20 into the ground as far as possible. Further rotation of the winch in this latter direction causes the elevation of one or both wheels from the ground, throwing the weight of the rear part of the plow on the bottom plate 30 of the support 20. The weight of the plow is thus carried until the plow is caused to advance. As soon as forward movement takes place, the support 20 and the plow point 26 enter the ground until a predetermined depth is reached at which point the wheels 9 will again function. The support 20 being placed at an efficient angle or rake materially assists the weight of the plow in maintaining a constant depth of trench due to the down pressure or suction caused or produced by the angle or rake of the support 20, spreader 24, cutting edge 25 and point 26. Another method of starting the plow may be provided by making a hole in the ground of the required depth into which the support 20 and its associated elements may be lowered. The desired depth of the trench is obtained by adjusting the support 20 to a predetermined position. The support is maintained or locked in this position by means of a pin 40 or the like, which is inserted through a selected one of a series of coinciding openings 40' provided in the parallel side plates 21 of the support 20, and through coinciding openings in the upper sides of parallel plates 13 carried by the inner channel members 6 of the main frame. In the position of the support shown in Fig. 1, the pin 40 is inserted in the uppermost opening in the plates 21. When the support is in this position the plow point 26 is adjusted to cause a maximum depth of trench. To make a trench of lesser depth, the pin 40 will be inserted through lower coinciding openings of the series 40', as may be desired. When the plow is not being used in cable laying operations, and it is desired to move it, the support 20 and its associated elements are raised clear of the ground by the winch mechanism. The support under these circumstances will be held in its raised position by elevating it in the tower 11 to a point where the top opening of the series 40' registers with the coinciding openings 55 provided through the side plates in the tower. A pin 40 is inserted through these openings and the support is thus held in its elevated position, so that the plow may travel along freely on its wheels with its support and associated elements clear of the ground.

An upright 41 is mounted and suitably braced on each of the outer channel members 7. A series of coinciding openings 42 arranged vertically are provided through each of these uprights in which the ends of a roller 43 may be journaled. This roller may be adjusted in said openings to a position to conform to the curvature of a cable 45 as it is being withdrawn from a cable drum 44 to enter cable feed tube 27, so that undue bending of the cable will be eliminated. Tubing 46 may be placed about the upper edges of the plates 13 to prevent injury to the inside end of the cable as it passes through the feed tube.

The plow 5 is attached to the rear end of a cable reel trailer 47 by means, for instance, of a suitable coupling which secures together the trailer and plow by means of a universal joint 10 on the latter member. The coupling and uncoupling operation of the plow and cable reel trailer may be readily and efficiently accomplished by reason of the location of the center of gravity on the plow as previously subscribed. The trailer may be of any desired character, and carries a cable drum 44 upon which cable 45 is wound. This cable is fed to the pipe 27 carried by the plow.

The cable trailer 47 is coupled to a drawbar connection of a tractor or the like which draws the trailer, plow and a back-filler 49.

The back-filler 49, which may be of any suitable character, is attached to the main frame of the plow 5. This back-filler will cause the spoil piles or earth formed by the plow to be thrown back to cover the cable and entirely fill the trench made by the plow-point. The back-filler 49 may be of a design similar to that illustrated in Fig. 6 and is provided with a hitch connection 50 by which it may be adjustably connected to the plow. A handle 51 may also be provided for the back-filler.

In the operation of the improved apparatus, the tractor, cable carrying trailer, plow and back-filler are connected together in the order mentioned. The support on the plow which carries the plow-point and cable feed tube is adjusted to a predetermined depth in the earth, as formerly described, at which the cable is to be laid. A rope is passed through the feed pipe of the plow and fastened to the outer end of the cable, which is wound on a drum carried by the trailer. The cable is then drawn through the tube by suitable means and is held until the plow and trailer have been drawn by the tractor a sufficient distance to permit the cable to be held by the earth which is thrown into the trench by means of the back-filler. The rope which was attached to the end of the cable may be now disconnected therefrom. The tractor is advanced, carrying with it the cable trailer, plow and back-filler until the cable is entirely withdrawn from its drum. At this point, the tractor is stopped and the empty cable drum is removed from the trailer and a fresh drum substituted therefor on the trailer. A cycle of operations similar to that just outlined may be continued until the necessary length of cable is laid. It will be understood that the cable is supported by the roller carried by the bracket on the plow as it is being withdrawn from the cable drum to guide the cable without undue bending into the feed tube. The support carrying the plow-point and the feed tube will function during the cable operations as previously outlined. Suitable means are provided when starting a new supply of cable to prevent undue tension from being set up in the cable when the inertia of the cable drum is overcome.

What is claimed is:

1. In apparatus for laying cable and the like, the combination of traction means, a cable carrier and also a plow arranged to be drawn by said traction means, said plow including a frame, an adjustable support mounted on said frame, earth-engaging means carried by the support for forming a trench, a feed pipe mounted on said support through which cable passes to be laid in said trench, an adjustable bracket on said frame for guiding cable from the cable carrier to said feed tube without undue bending of the cable, and a cable reel mounted on the cable carrier to automatically supply cable to said feed tube over said adjustable bracket.

2. In an apparatus for laying cable and the like, a plow having a wheeled frame, a guideway mounted on said frame, a support adjustably mounted in the guideway, an earth-engaging point carried by the support and adapted to form a trench at a desired depth, a feed tube of ogee form carried by said support, said feed tube having flared end portions being of such shape as to permit the passage of cable therethrough without undue bending thereof and having a discharge portion for laying the cable in the trench at a depth constant to that made by the earth-engaging point, and means for directing the cable into the entrance mouth of the feed tube.

3. In an apparatus for laying cable and the like, a plow having a wheeled frame, a guideway mounted on said frame, a support adjustably mounted in the guideway, an earth-engaging point and a feed tube carried by the support, said earth-engaging point extending forwardly and downwardly from the support and being adapted to form a trench at a desired depth and said feed tube extending to the rear of the earth-engaging point and being adapted to supply cable therethrough into the trench at a depth constant to that made by the earth-engaging point, and adjustable means mounted on said frame to guide a cable without undue bending into the feed tube.

4. In an apparatus for laying cable and the like, a plow having a wheeled frame, a guideway extending in a substantially vertical direction from said frame, a support mounted to be raised and lowered in the guideway, an earth-engaging member including a cutter for roots and the like and a point carried by the support for forming a trench and tending by its suction to maintain the earth-engaging member at a depth determined by the position of the support in the guideway, a feed tube mounted on the support for supplying cable to be laid in said trench at a depth constant to the depth made by said point, and adjustable means mounted on said frame for guiding a cable without undue bending into the feed tube.

5. In apparatus for laying cable and the like, the combination of traction means, a cable carrier and also a plow arranged to be drawn by said traction means, said plow being adapted to form a trench, said cable carrier supplying cable from a point ahead of said plow to be automatically fed through the plow into the trench formed thereby, a guide for feeding the cable from the cable carrier through the plow, said guide being so curved that its entrance mouth points in the direction from which the cable is fed and its discharge mouth points toward the line of the trench, and means for directing the cable from the carrier into the entrance mouth of the feed tube.

6. In apparatus for laying cable and the like, the combination of traction means, a cable carrier and also a plow arranged to be drawn by said traction means, said plow being adapted to form a trench, said cable carrier supplying cable from a point ahead of said plow to be automatically fed through the plow into the trench formed thereby, a guide for feeding the cable from the cable carrier through the plow, said guide being so curved that its entrance mouth points in the direction from which the cable is fed and its discharge mouth points toward the line of the trench, said guide being so curved between said mouths as to subject the cable to no undue bending in passing through the guide, and means for directing the cable from the carrier into the entrance mouth of the feed tube.

7. In apparatus for laying cable and the like, the combination of traction means, a cable carrier and also a plow arranged to be drawn by said traction means, said plow being adapted to form a trench, said cable carrier supplying cable from a point ahead of said plow to be automatically fed through the plow into the trench formed thereby, a feed tube for the feeding cable from the cable carrier through the plow, said feed tube being so curved that its entrance mouth points in the direction from which the cable is fed and its discharge mouth points toward the line of the trench, and means for directing the cable from the carrier into the entrance mouth of the feed tube.

8. In apparatus for laying cable and the like, the combination of traction means, a cable carrier and also a plow arranged to be drawn by said traction means, said plow being adapted to form a trench, said cable carrier supplying cable from a point ahead of said plow to be automatically fed through the plow into the trench formed thereby, a feed tube for feeding the cable from the cable carrier through the plow, said feed tube being so curved that its entrance mouth points in the direction from which the cable is fed and its discharge mouth points toward the line of the trench, said feed tube being so curved between said mouths as to subject the cable to no undue bending in passing through the guide, and means for directing the cable from the carrier into the entrance mouth of the feed tube.

9. In apparatus for laying cable and the like, the combination of traction means, a cable carrier and also a plow arranged to be drawn by said traction means, said plow being adapted to form a trench, said cable carrier supplying cable from a point ahead of said plow to be automatically fed through the plow into the trench formed thereby, a feed tube for feeding the cable from the cable carrier through the plow, said feed tube having its entrance mouth bent in one direction and of such radius as to conform to the curvature of the cable as it enters the tube and having its discharge mouth bent in the opposite direction and of such radius as to cause the cable to be discharged from said tube in a direction toward the line of the trench and laid at a substantially constant depth therein, and means for directing the cable from the carrier into the entrance mouth of the feed tube.

10. In apparatus for laying cable and the like, the combination of traction means, a cable carrier and also a plow arranged to be drawn by said traction means, such plow being adapted to form a trench, said cable carrier supplying cable from a point ahead of said plow to be automatically fed through the plow into the trench formed thereby, a feed tube for feeding the cable from the cable carrier through the plow, said feed tube having its entrance mouth bent in one direction and of such radius as to conform to the curvature of the cable as it enters the tube and having its discharge mouth bent in the opposite direction and of such radius as to cause the cable to be discharged from said tube in a direction toward the line of the trench and laid at a substantially constant depth therein, said feed tube being so curved between said mouths as to subject the cable to no undue bending in passing through the feed tube, and means for directing the cable from the carrier into the entrance mouth of the feed tube.

11. In apparatus for laying cable and the like, the combination of traction means, a cable carrier and also a plow arranged to be drawn by said traction means, said plow including a frame, an adjustable support mounted in a substantially vehicle position on said frame, earth-engaging means carried by the support for forming a trench, a feed pipe mounted on said support and having an inlet end bent in one direction for receiving cable and an outlet end bent in a direction opposite the inlet end for discharging cable into said trench, a cable reel mounted on said cable carrier to automatically supply cable to the feed pipe, and means for directing the supplied cable into the inlet end of the feed pipe.

12. In apparatus for laying cable and the like, the combination of traction means, a cable carrier and also a plow arranged to be drawn by said traction means, said plow including a frame and an adjustable support mounted in a substantially vertical position on said frame, earth-engaging means carried by the support for forming a trench, a feed pipe mounted on said support and having an inlet end provided with a flared opening for receiving cable and an outlet end provided with a flared opening for discharging cable into said trench, a cable reel mounted on said carrier ahead of said plow to automatically supply cable to the feed tube, and means for directing the supplied cable into the flared opening of the inlet end of the feed tube.

13. In apparatus for laying cable and the like, the combination of traction means, a cable carrier and also a plow arranged to be drawn by said traction means, said plow including a frame, an adjustable support mounted on said frame, earth-engaging means carried by the support for forming a trench, a feed pipe mounted on said support through which cable passes to be laid in said trench, an adjustable bracket on said frame, means for guiding cable from the cable carrier to said feed tube without undue bending of the cable, and a cable reel mounted on the cable carrier to automatically supply cable to said feed tube over said last mentioned means.

14. In an apparatus for laying cable and the like, the combination of traction means, a cable carrier and also a plow arranged to be drawn by said traction means, said plow including a frame, a guideway mounted on said frame, a support adjustably mounted in said guideway, an earth-engaging member and a feed tube having flared inlet and outlet ends carried by said support, means carried by said guideway and connected with said support to cause it to lower and raise the earth-engaging member and the feed tube simultaneously, means for guiding the cable into the flared inlet end of the feed tube, and means for covering the laid cable.

In testimony whereof, FREDERICK B. PITTS has signed his name to this specification on the 30th day of October, 1930 and MARSHALL T. GARLINGER and TEMPLE C. SMITH have signed their names to this specification on the 10th day of November, 1930.

FREDERICK B. PITTS.
MARSHALL T. GARLINGER.
TEMPLE C. SMITH.